United States Patent
Cordero et al.

(10) Patent No.: US 9,727,413 B2
(45) Date of Patent: Aug. 8, 2017

(54) FLASH MEMORY SCRUB MANAGEMENT

(71) Applicant: International Business Machines Corporation, Armonk, NY (US)

(72) Inventors: Edgar R. Cordero, Round Rock, TX (US); Gary A. Tressler, Sandy Hook, CT (US); Diyanesh B. Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/929,853

(22) Filed: Jun. 28, 2013

(65) Prior Publication Data

US 2015/0006998 A1   Jan. 1, 2015

(51) Int. Cl.
*G06F 11/10* (2006.01)
*G06F 11/00* (2006.01)

(52) U.S. Cl.
CPC .................. *G06F 11/106* (2013.01)

(58) Field of Classification Search
None
See application file for complete search history.

(56) References Cited

U.S. PATENT DOCUMENTS

| | | | |
|---|---|---|---|
| 5,941,998 A * | 8/1999 | Tillson | G06F 11/1435 714/54 |
| 7,012,835 B2 | 3/2006 | Gonzalez et al. | |
| 7,224,607 B2 | 5/2007 | Gonzalez et al. | |
| 7,477,547 B2 * | 1/2009 | Lin | 365/185.09 |
| 7,518,919 B2 | 4/2009 | Gonzalez et al. | |
| 7,573,773 B2 | 8/2009 | Lin | |
| 7,774,540 B2 * | 8/2010 | Han | G11B 20/1816 711/112 |
| 8,004,895 B2 * | 8/2011 | Gonzalez et al. | 365/185.11 |
| 8,050,095 B2 | 11/2011 | Gonzalez et al. | |
| 8,266,504 B2 | 9/2012 | Arimilli et al. | |
| 8,335,238 B2 | 12/2012 | Arimilli et al. | |
| 8,982,653 B2 * | 3/2015 | Nurminen | G11C 7/04 365/211 |
| 2003/0135794 A1 * | 7/2003 | Longwell et al. | 714/42 |
| 2006/0090112 A1 * | 4/2006 | Cochran | G06F 12/0804 714/737 |
| 2013/0128666 A1 * | 5/2013 | Avila et al. | 365/185.11 |
| 2014/0006859 A1 * | 1/2014 | Ryu | G06F 11/106 714/21 |

(Continued)

FOREIGN PATENT DOCUMENTS

EP   1847930 B1   6/2009

OTHER PUBLICATIONS

Burek, R.K.: 'The near solid-state data recorders', Johns Hopkins APL Tech. Dig., 1998, 19, (2), pp. 235-240, http://www.jhuapl.edu/techdigest/TD/td1902/burek.pdf.*

(Continued)

*Primary Examiner* — Justin R Knapp
(74) *Attorney, Agent, or Firm* — Wood, Herron & Evans, LLP; Robert R. Williams

(57) ABSTRACT

A method, computer-readable storage media, and a system are provided for managing a scrub. The method may include detecting a trigger for the scrub. The trigger may be based upon a metric of a memory unit. The method may further include scrubbing the memory unit based upon the detection of the trigger.

14 Claims, 4 Drawing Sheets

(56) References Cited

U.S. PATENT DOCUMENTS

2014/0229766 A1\* 8/2014 Campbell ................. 714/15
2014/0245062 A1\* 8/2014 Cooper ............... G06F 11/1092
　　　　　　　　　　　　　　　　　　　　　　　　714/6.22

OTHER PUBLICATIONS

Awasthi, M., et al., "Efficient Scrub Mechanisms for Error-Prone Emerging Memories", 2012 IEEE 18th International Symposium on High Performance Architecture (HPCA), IEEE Computer Society, Washington, DC, USA. DOI: 10.1109/HPCA.2012.6168941.
Jiang, A., et al., "Error Scrubbing Codes for Flash Memories", CWIT 2009: The 11th Canadian Workshop on Information Theory, 2009. pp. 32-35. DOI: 10.1109/CWIT.2009.5069515.
Reardon, J., et al., "Data Node Encrypted File System: Efficient Secure Deletion for Flash Memory", Security '12: Proceedings of the 21st USENIX Conference on Security Symposium, USENIX Association, Berkeley, CA, © 2012.

\* cited by examiner

FLASH MEMORY SCRUB MANAGEMENT

TECHNICAL FIELD

This disclosure generally relates to memory for a computing system, and in particular, to management of scrubbing memory.

BACKGROUND

Modern computer systems may use a variety of types of memory or memory subsystems. This may include memory subsystems that may include main memory, cache, and memory controllers and buffers. The memory subsystems may be one place where the computer holds current programs and data that are in use by the cores. Memory and memory subsystems may be vulnerable to failure or error.

SUMMARY

In one embodiment, a method is provided for managing a scrub. The method may include detecting a trigger for the scrub. The trigger may be based upon a metric of a memory unit. The method may further include scrubbing the memory unit based upon the detection of the trigger.

In another embodiment, a computer-readable storage media is provided for managing a scrub. The computer-readable storage media may provide for detecting a trigger for the scrub. The trigger may be based upon a metric of a memory unit. The computer-readable storage media may provide for scrubbing the memory unit based upon the detection of the trigger.

In another embodiment, a system may include a memory device having one or more memory units. The system may further include a memory controller, in communication with the one or more memory units. The memory controller may have a trigger for scrubbing at least one of the one or more memory units. The trigger may be based upon a metric of a memory unit of the one or more memory units.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

In many types of memory and memory subsystems, memory scrubbing may be used for detecting and correcting failures or errors in the memory. An error in memory may be caused by an alpha or other particle, or by a physical defect in the cell. In various embodiments, memory scrubbing may use a process of detecting and correcting bit errors in memory such as error-detecting codes (ECC). In other embodiments, other detection and correction types may be used. In embodiments using ECC, the information in memory using ECC is stored redundantly enough to correct a single bit error per memory word. For example, if a memory controller scrubs systematically through the memory, a single bit errors can be detected, the erroneous bit can be determined using a ECC checksum, and the corrected data can be written back to the memory. In order to not disturb regular memory requests from the CPU and thus prevent decreasing performance, scrubbing may be done during idle periods, according to some embodiments. As the scrubbing may consists of normal read and/or write operations, it may increase power consumption for the memory compared to non-scrubbing operation. Therefore, scrubbing is not performed continuously but periodically, according to various embodiments. For many servers, the timing or period for the scrub may be configured in the BIOS setup program.

Figure 1A:
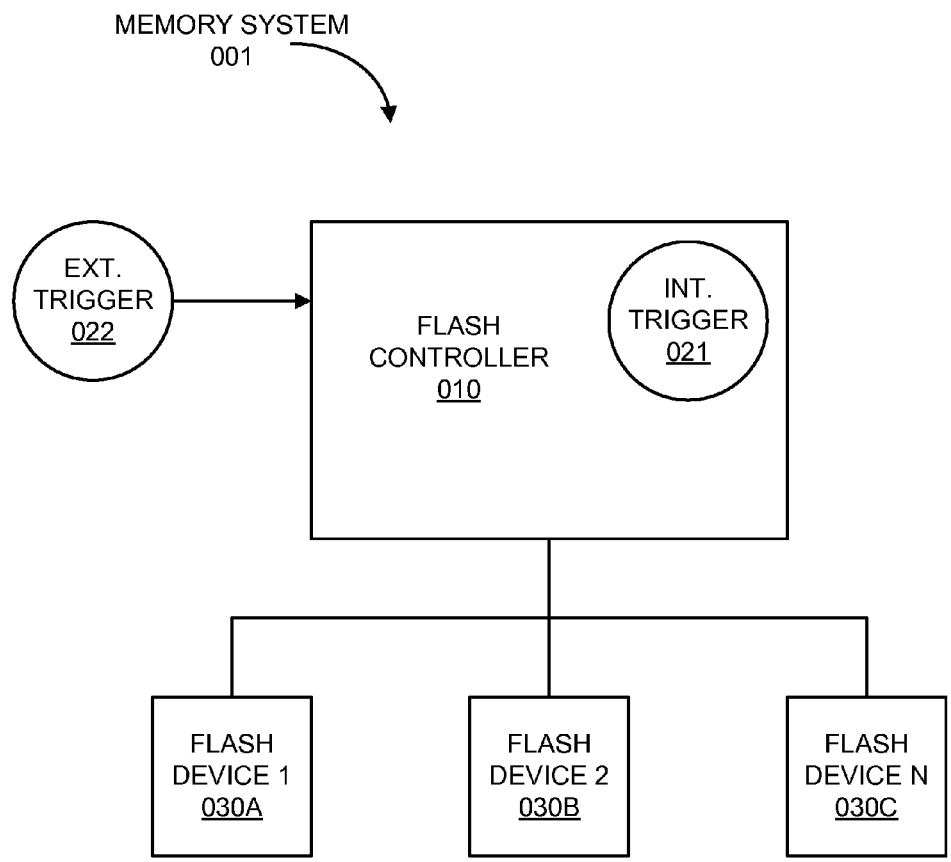
FIG. 1A depicts a high-level block diagram of an example system for implementing an embodiment of the invention.
Figure 1B:
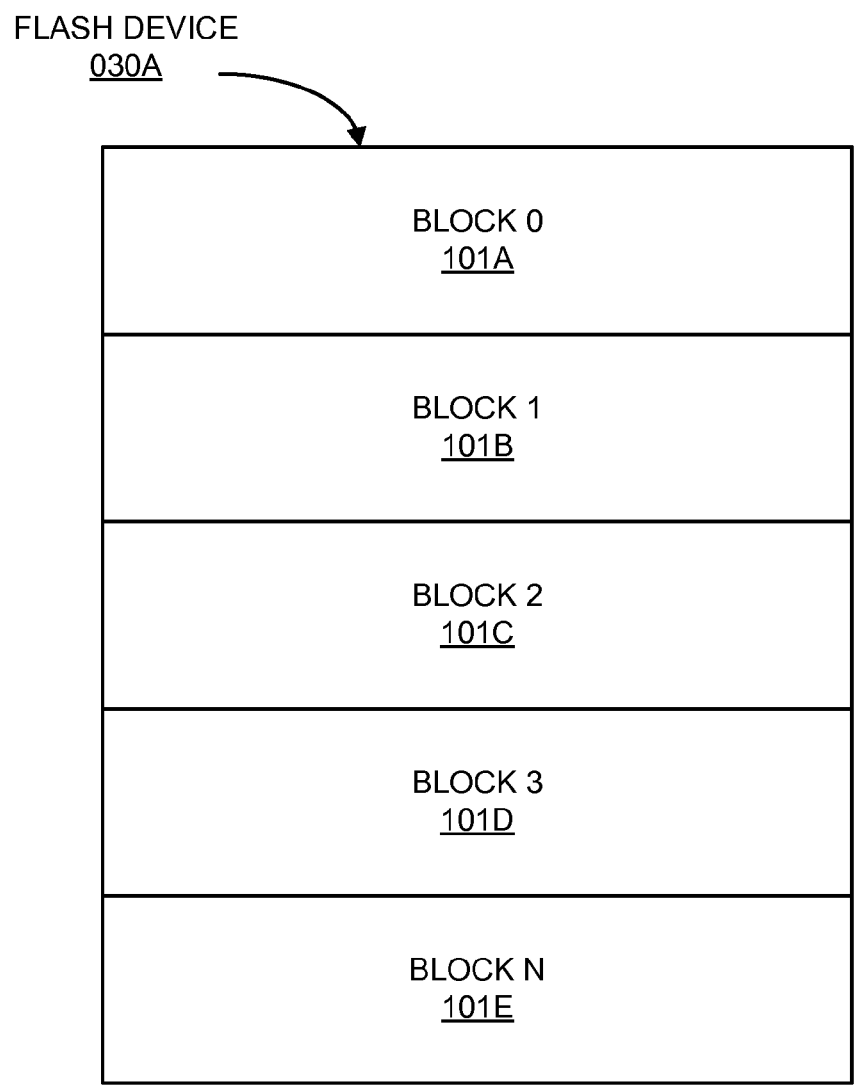
FIG. 1B depicts a high-level block diagram of an example system for implementing an embodiment of the invention.

FIGS. 1A and 1B depict high-level block diagrams of exemplary systems for implementing an embodiment of the invention. FIG. 1A depicts a high-level block diagram of an exemplary non-volatile memory system for implementing an embodiment of the memory scrub management disclosed. FIG. 1B depicts a high-level block diagram of an exemplary flash device used in FIG. 1A for implementing an embodiment of the memory scrub management disclosed. The exemplary non-volatile memory system shown is a flash memory system. The use of a flash memory system is for example only and is not to be construed or implied to be limiting to the scope of the presented invention.

In an embodiment, FIG. 1A illustrates memory system 001 consisting of a flash controller 010 in communication with and managing the use of multiple memory devices. The memory devices are illustrated as flash devices 1 through N, 030A-030C respectively. The flash controller 010 may have an internal trigger 021 for scrubbing the flash memory. The flash controller 010 may also have an external trigger 022 for scrubbing the flash memory. In various embodiments, various types of memory may be used and in varying quantity from that shown. For example, the memory may be of DRAM or SRAM type of memory. In various embodiments, a controller may be part of a memory device or separate as illustrated with the flash memory example. In various embodiments, the triggers of each type, external or internal, may be more numerous or individual absent.

In various embodiments, either the external trigger 022 or the internal trigger 021 may communicate, or signal, the flash controller 010 that one or more memory units in flash devices 1-N 030A-030C may be scrubbed. The external trigger 022 or the internal trigger 021 (generally referred to as a trigger) may be based upon a metric of a memory unit, which is described below. In various embodiments, the trigger may communicate a scrub of more than one memory unit on one or more memory devices, such flash memory devices 1-N, 030A-030C respectively. In various embodiments, the external trigger 022 is a trigger that is determined by data or information outside of the flash controller 010. In various embodiments, internal trigger 021 is a trigger that is determined by data or information inside the flash controller 010. In various embodiments, external triggers 022 and internal triggers 021 may be combined or mixed. For example, the external trigger 022 may be a heat sensor, or sensors, monitoring the parts of the various flash devices 1-N 030A-030C and sending the trigger to scrub a memory unit based upon temperature information. Input from a heat sensor may be used as a metric for the trigger since in various memory types reliability may change based upon the temperature of the memory. In another example, the internal trigger 021 may be information the flash controller 010 maintains on the access history of a memory unit and the trigger of a scrub may be based upon that information. An example of a combination of an internal trigger 021 and an external trigger 022 may be made using the heat sensor again. In this example, the heat sensor, an external source may communicate with the flash controller 010. The information from the heat sensor may be processed by the flash controller 010, for example using a table, to trigger the scrub of various memory units.

The use of a metric of a memory unit to trigger a scrub may improve the efficiency of the system. For example, the scrubbing of a specific memory unit or memory units instead of all memory reduces the workload on the system. Some types of memory may have a limited life based upon amount of access. Managing the amount of scrubs the memory unit receives may prolong the life of the memory. The use of targeted scrubs using triggers based off metrics may also provide for protection against failure or error in a high risk memory unit. For example, memory units with metrics of high access or high error rates may be scrubbed more often to protect the use of data in such a memory unit. This may be done because in various memory types error or failure rates may be expected to occur more frequently the more often it is accessed.

FIG. 1B depicts a high-level block diagram of an exemplary flash device used in FIG. 1A for implementing an embodiment of the memory scrub management disclosed. In the illustrated example, flash device 1 030A is depicted as being composed of multitude of memory units. The memory units are depicted as block 0 through block N, 101A through 101E respectively. The use of blocks, or memory blocks, is for example only and memory units may vary in other embodiments. For example, a memory unit may be a page or a sector also. In various embodiments, the metric the trigger is based upon may be for 1 or more of these memory units and the trigger may be for 1 or more of the memory units. For example, access rate information may be kept for each block 101. In the example, a trigger may be based upon the access rate metric and activate a scrub for units above a certain threshold.

Figure 2:
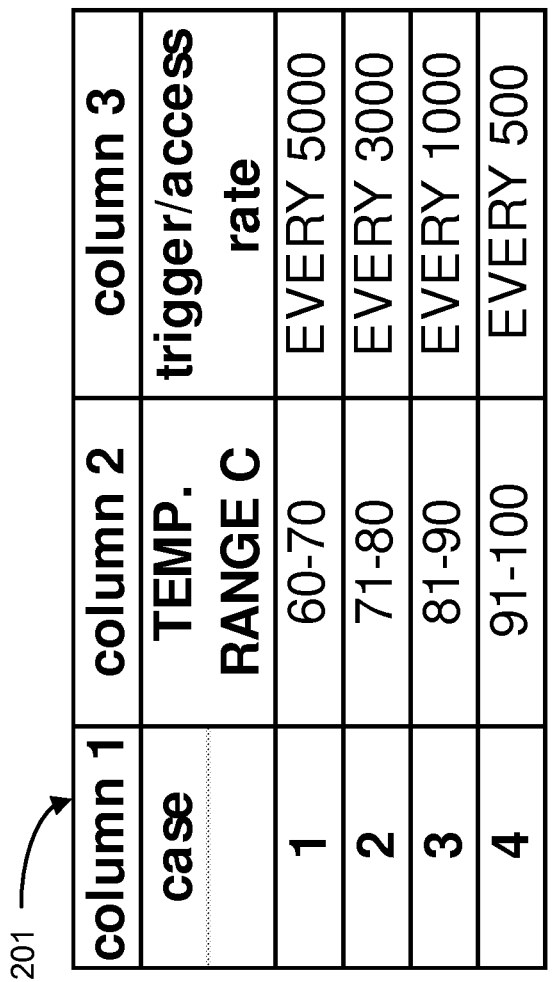
FIG. 2 is detailed illustration of an example table that may be used by the system in FIG. 1A, according to an embodiment of the invention.

FIG. 2 is a detailed illustration of a table 201 that may be used by a non-volatile memory controller, such as flash controller 021, for the trigger of a scrub based on a metric for a memory unit, according to an embodiment of the invention. In the illustrated embodiment, the table 201 may be used in the previously discussed example of a combination of an internal trigger 021 and an external trigger 022. The table 201 may be used by the flash controller 010 in combination with the input of a heat sensor. In this example, the heat sensor, an external source, may communicate with the flash controller 010 information, such as temperature of one or more memory units. The information from the heat sensor may be processed by the flash controller 010, for example using a table 201, to trigger the scrub of various memory units based upon the temperature provided by the heat sensor. For example, the heat sensor may report a temperature of 78 C for the memory unit. The flash controller 010 may take this input and compare it to table 201. The flash controller 010 may look up 78 C on the table in column 2, "TEMP. RANGE C", and find a trigger per access rate value in column 3. In this example, the trigger per access rate would be every 3000 access. The flash controller 010 may combine this with an access counter to create a trigger for a scrub based upon the metric, in this example the temperature input. This is exemplary only and not to be considered limiting to the form, location, type of input, tables, or data that may be used as a metric, system, or event that may cause the trigger.

In various embodiments, a multitude of tables may be available to the system. In such embodiments, the selection of the table 201 to use may be based upon user selection, program, firmware, application preferences, or operating system programming. In various embodiments, the table selection may be based upon a preferred or designated performance metric similar to the performance metric used for selecting between cases on a single table 201. For example, the first table may look up a value based upon temperature input and in turn reference a second table that uses historical error rate to find a trigger rate. It is contemplated that, a variety of tables, parameters, performance metrics, and selection criteria may possibly be used and be within the scope of the invention. In various embodiments, the table may be stored in memory accessible to the system.

Figure 3:
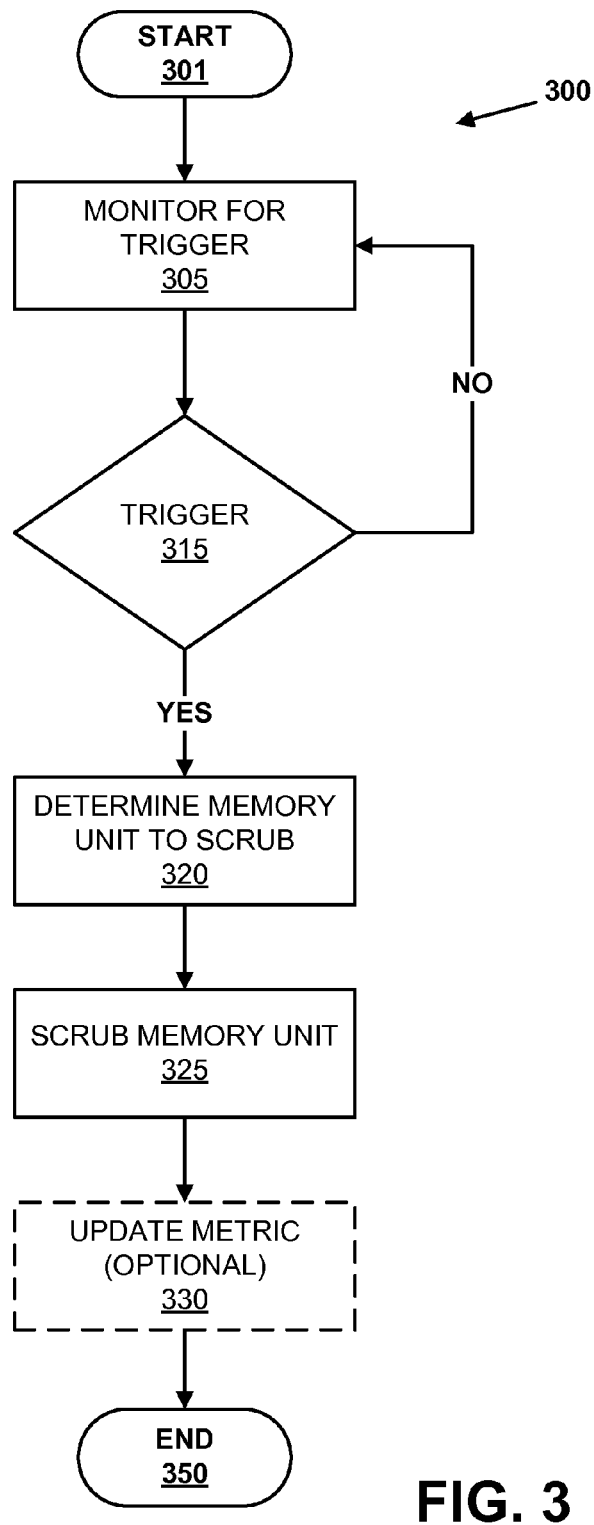
FIG. 3 is a flowchart illustrating a method for managing a first node's resources upon a failure inside the first node, according to an embodiment of the invention.

FIG. 3 is a flowchart illustrating a method 300 for managing a scrub. The method may start at block 301. In block 305, the system may monitor for a trigger, either external, internal. Or a combination as explained earlier, that may indicate the scrub of one or memory units may occur. In the embodiment of FIG. 1A the flash controller 010 may be the monitoring system. Here, once again, the reference to flash memory is for example only and not meant to be limiting. In other embodiments, the system monitoring for the scrub may be other elements of the memory system 001 or an element in communication with the memory system 001. In block 315, a determination is made whether a trigger has been detected. If no trigger is detected, the method 300 may continue monitoring in block 305. If a trigger is detected, the method may proceed to block 320. In block 320, the system may determine which memory unit, or units, should be scrubbed based on the trigger. In various embodiments, this may be part of the received trigger.

In block 325, the system may scrub the memory unit for which the trigger was detected. In various embodiments, this may be either a read scrub or a write scrub. A read scrub is a scrub where the memory unit is read and the data is checked for errors. A write scrub is a scrub where the new data is written to the memory unit and then read and the data is checked for errors. In various embodiments, the scrubbing of the memory unit may be delayed based upon the availability of system resources required for the scrub.

In block 330, and optional update of the metric, or metrics, used for triggering a scrub may occur. The update of the metric may include various information such as, but not limited to, error occurrence during scrub or resetting counters for determining scrub triggers. The method may end at block 350.

Exemplary embodiments have been described in the context of a fully functional system for managing a scrub. Readers of skill in the art will recognize, however, that embodiments also may include a computer program product disposed upon computer-readable storage medium or media (or machine-readable storage medium or media) for use with any suitable data processing system or storage system. The computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer or storage system having suitable programming means will be capable of executing the steps of a method disclosed herein as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the claims.

As will be appreciated by one skilled in the art, aspects may be embodied as a system, method, or computer program product. Accordingly, aspects may the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium is a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terms "server and "mobile client" are used herein for convenience only, and in various embodiments a computer system that operates as a mobile client computer in one environment may operate as a server computer in another environment, and vice versa. The mechanisms and apparatus of embodiments of the present invention apply equally to any appropriate computing system, including a computer system that does not employ the mobile client-server model.

While this disclosure has described the details of various embodiments shown in the drawings, these details are not intended to limit the scope of the invention as claimed in the appended claims.

What is claimed is:

1. A method for managing memory scrubbing in a flash memory unit, the method comprising:
   detecting, using a first sensor external to a flash controller communicatively connected to a flash memory unit, a first temperature metric for the flash memory unit;
   detecting, using a second sensor internal to the flash controller, a first access rate metric for the flash memory unit;
   determining a trigger, the trigger based on temperature and access rate for the flash memory unit;
   detecting, based on the first temperature metric and the first access rate metric, that the trigger has been achieved; and
   write scrubbing the flash memory unit in response to detecting that the trigger has been achieved by writing new data to the flash memory unit, and then reading and error checking the data from the flash memory unit.

2. The method of claim 1, further comprising:
   delaying the write scrubbing of the flash memory unit based upon the availability of system resources required for the write scrubbing.

3. The method of claim 1, wherein the flash memory unit is selected as one or more of a group consisting of a memory block, a memory page, and a memory sector.

4. The method of claim 1, further comprising:
   detecting, using the second sensor, an error history metric for the flash memory unit;
   wherein the trigger is further based on the error history metric.

5. The method of claim 1, further comprising:
   detecting, using the first sensor, a second temperature metric for the flash memory unit;
   detecting, using the second sensor, a second access rate metric for the flash memory unit;
   detecting, based on the second temperature metric and the second access rate metric, that the trigger has been achieved; and
   read scrubbing the flash memory unit in response to detecting that the trigger has been achieved.

6. A computer program product for managing memory scrubbing in a flash memory unit, the computer program product comprising a computer readable storage medium having program instructions embodied therewith, the program instructions executable by a computer to cause the computer to perform a method comprising:
   detecting, using a first sensor external to a flash controller communicatively connected to a flash memory unit, a first temperature metric for the flash memory unit;
   detecting, using a second sensor internal to the flash controller, a first access rate metric for the flash memory unit;
   determining a trigger, the trigger based on temperature and access rate for the flash memory unit;
   detecting, based on the first temperature metric and the first access rate metric, that the trigger has been achieved; and
   write scrubbing the flash memory unit in response to detecting the trigger by writing new data to the flash memory unit, and then reading and error checking the data from the flash memory unit.

7. The computer program product of claim 6, wherein the program instructions executable by the computer cause the computer to perform the method further comprising:
   delaying the write scrubbing of the flash memory unit based upon the availability of system resources required for the write scrubbing.

8. The computer program product of claim 6, wherein the flash memory unit is selected as one or more of a group consisting of a memory block, a memory page, and a memory sector.

9. The computer program product of claim 6, wherein the program instructions executable by the computer cause the computer to perform the method further comprising:
   detecting, using the second sensor, an error history metric for the flash memory unit;
   wherein the trigger is further based on the error history metric.

10. The computer program product of claim 6, wherein the program instructions executable by the computer cause the computer to perform the method further comprising:
    detecting, using the first sensor, a second temperature metric for the flash memory unit;
    detecting, using the second sensor, a second access rate metric for the flash memory unit;
    detecting, based on the second temperature metric and the second access rate metric, that the trigger has been achieved; and
    read scrubbing the flash memory unit in response to detecting that the trigger has been achieved.

11. A system comprising:
    a flash memory unit;
    a first sensor configured to:
    sense a first temperature metric for the flash memory unit; and
    a flash memory controller, in communication with the flash memory unit, the flash memory controller configured to:
    detect a first access rate metric for the flash memory unit;
    determine a trigger, the trigger based on temperature and access rate for the flash memory unit;
    detect, using the first temperature metric and the first access rate metric, that the trigger has been achieved; and
    write scrub the flash memory unit in response to detecting that the trigger has been achieved by writing new data to the flash memory unit, and then reading and error checking the data from the flash memory unit.

12. The system of claim 11, wherein the flash memory controller is further configured to:
    detect an error history metric;
    wherein the trigger is further based on the error history metric.

13. The system of claim 11, wherein the flash memory unit is selected as one or more from a group consisting of a memory block, a memory page, and a memory sector.

14. The system of claim 11, wherein:
    the first sensor is further configured to:
    sense a second temperature metric for the flash memory unit; and
    wherein the flash memory controller is further configured to:
    detect a second access rate metric for the flash memory unit;
    detect, using the second temperature metric and the second access rate metric, that the trigger has been achieved; and read scrub the flash memory unit in response to detecting that the trigger has been achieved.

\* \* \* \* \*